United States Patent [19]

Karlsson et al.

[11] Patent Number: 5,222,355
[45] Date of Patent: Jun. 29, 1993

[54] FLYWHEEL ATTACHMENT FOR AN INTERNAL COMBUSTION ENGINE HAVING AN EXHAUST GAS TURBINE GEARED TO THE CRANKSHAFT

[75] Inventors: Karl-Erik Karlsson, Södertälje; Peter Sperle, Nykvarn, both of Sweden

[73] Assignee: Saab-Scania Aktiebolag, Sweden

[21] Appl. No.: 860,496

[22] PCT Filed: Dec. 20, 1990

[86] PCT No.: PCT/SE90/00857
§ 371 Date: Jun. 15, 1992
§ 102(e) Date: Jun. 15, 1992

[87] PCT Pub. No.: WO91/10049
PCT Pub. Date: Jul. 11, 1991

[30] Foreign Application Priority Data

Dec. 28, 1989 [SE] Sweden ................. 8904374

[51] Int. Cl.[5] ............................................. F02B 41/10
[52] U.S. Cl. .................................................... 60/624
[58] Field of Search ......................... 60/607, 608, 624

[56] References Cited

U.S. PATENT DOCUMENTS 2,372,676  4/1945  Kilchenmann ............... 60/607
3,739,572  6/1973  Duerr ............................ 60/607
4,586,337  5/1986  Fox ........................... 60/624 X

FOREIGN PATENT DOCUMENTS 8600665  1/1986  PCT Int'l Appl. .
8600665  1/1986  PCT Int'l Appl. .
1476328  6/1977  United Kingdom

OTHER PUBLICATIONS

"Mitsubishi Motors Shop Manual, Diesel Engine, 6D2, 8DC '89," Sept. 1988.
"Caterpillar Specification 3304B & 3306B Industrial and Marine Engines," Aug. 1989.

Primary Examiner—Michael Koczo
Attorney, Agent, or Firm—Ostrolenk, Faber, Gerb & Soffen

[57] ABSTRACT

An internal combustion engine assembly of the compound type for vehicles comprises an internal combustion engine, a turbine and a transmission arranged between the turbine and a crankshaft forming part of the engine. The turbine is designed to be driven by exhaust gases from the engine. On the rear end of the crankshaft a gear wheel is mounted. On this gear wheel there is formed a flange which functions as an extension of the crankshaft and attachment for a flywheel. With the present invention, it is possible to transmit the power from the turbine to the crankshaft without modifying the ring gear of the flywheel. The invention also affords advantages in terms of manufacturing, assembly and maintenance technology.

8 Claims, 2 Drawing Sheets

FLYWHEEL ATTACHMENT FOR AN INTERNAL COMBUSTION ENGINE HAVING AN EXHAUST GAS TURBINE GEARED TO THE CRANKSHAFT

The present invention relates to an internal combustion engine assembly of the compound type for vehicles, comprising an internal combustion engine, a turbine, and a crankshaft issuing from the engine, the turbine being designed to be driven by exhaust gases from the engine.

PRIOR ART

Designers of internal combustion engines have for a long time attempted to obtain, to the greatest possible extent, from the engine's exhaust gases the energy which would otherwise be lost. A customary way of doing this is to equip the engine with a so-called turbocharger consisting of a turbine which is driven by the exhaust and is mechanically coupled to a compressor designed to compress the combustion air for supercharging the engine. Ever since their appearance in vehicle engines 40 to 50 years ago, turbochargers have been developed and refined and have thereby attained a high level of adjustability and operational reliability. Nevertheless, a large amount of energy still remains in the exhaust gases after leaving the turbine.

A method for utilising at least some of this surplus energy is to arrange, in series with and downstream of this first turbine, a second turbine driven by the exhaust gases. If this second turbine is in some way coupled so that it transmits mechanically some of the surplus energy to the crankshaft of the engine or to transmissions connected thereto, a so-called turbocompound system is obtained. Such systems are previously known, for example from U.S. Pat. No. 4,586,337 and published international patent application WO 86/00,665. These two specifications illustrate exhaust turbines which, via a long shaft, transmit the energy obtained from the exhaust to the crankshaft via the timing gears of the camshaft transmission. In this way it is possible to use gears already constructed for permanent load. However, this arrangement is complicated and in addition requires a great deal of space. A further disadvantage lies in the fact that the torque obtained from the power turbine is conveyed to the camshaft gear directly, which is unfavorable since the camshaft drive from the crankshaft is optimised in order to give valve opening times which are uniform and synchronised with the crankshaft. A non-uniform torque pulsation which is conveyed to the camshaft timing gears directly from the power turbine can have a negative effect on the optimum valve synchronisation and necessitates redesigning of the camshaft drive, taking into consideration the induced pulsations from the power turbine.

It is also known to transmit the energy from the exhaust gas turbine via a transmission to the starter ring gear on the flywheel. However, this requires that the toothing on a ring gear adapted to starter operation be modified in such a way that it matches the loads and speeds transmitted by the transmission coupled to the turbine.

OBJECT OF THE INVENTION

An object of the present invention is to provide a possibility of transmitting the energy from the turbine to the crankshaft without having to modify the flywheel, particularly in respect of the ring gear for the starter, or transmitting the energy to the crankshaft via the camshaft timing gears. Another object is to be able to use one and the same base engine in the engine program, which base engine can be used with or without compound addition, and where the only component needing to be changed in the base engine is a flywheel casing. A further object of the invention is to provide an internal combustion engine assembly of the compound type, which, in comparison with previously known arrangements of the same type, affords advantages in terms of manufacturing, assembly and maintenance technology.

In these respects, the assembly according to the invention is characterised by the fact that, on an endplate secured to the crankshaft, a gear wheel forming part of the transmission is arranged in a rotationally fixed manner, and by the fact that there is formed on the gear wheel a flange which functions as an extension of the crankshaft, directed from the endplate, and an attachment for a flywheel, by means of which the internal combustion engine assembly permits a simple changeover between, on the one hand, manufacture of engine assemblies with turbocompound addition where the gear wheel for the transmission of the turbine is arranged between the endplate of the crankshaft and the flywheel and, on the other hand, manufacture of engine assemblies without turbocompound addition where the flywheel is directly secured against the endplate of the crankshaft. In this way, existing internal combustion engine assemblies can be used without any great intervention or modifications being necessary, other than changing the flywheel casing in the base engine. Existing flywheels can also be used in engines with or without compound addition since the new flywheel attachment on the additional gear wheel is identical to the flywheel attachment on the endplate of the crankshaft.

An embodiment which is particularly advantageous in terms of assembly and maintenance is achieved if the flywheel is enclosed in a casing fixed to the engine. This casing functions as an attachment for an intermediate gear wheel, via which energy is conveyed from the turbine to the crankshaft, i.e. in practice to the gear wheel which is arranged on the endplate secured to the crankshaft.

An embodiment illustrating the invention will be described in greater detail below with reference to the attached figures.

DESCRIPTION OF A PREFERRED EMBODIMENT

Figure 1:
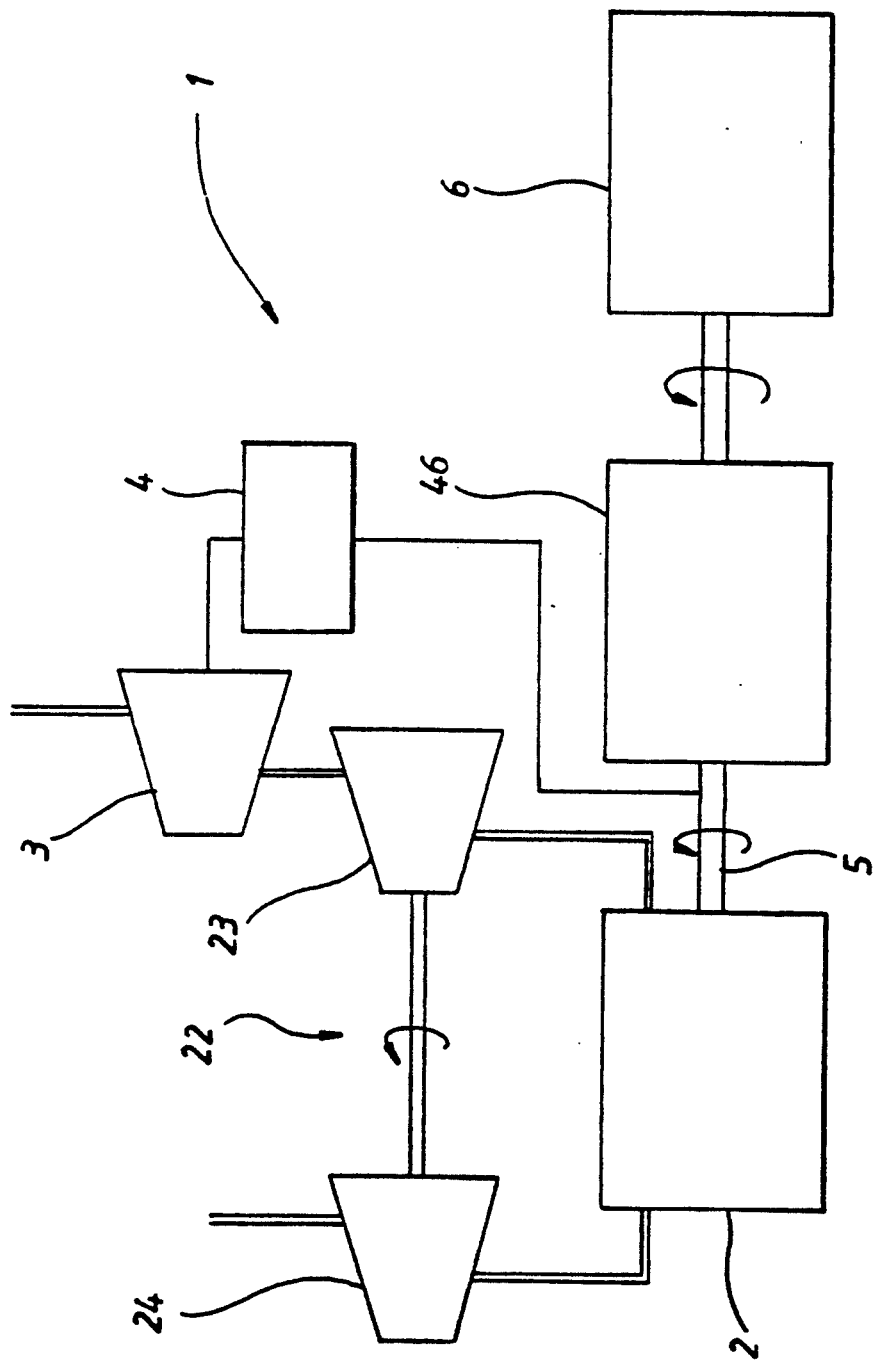
FIG. 1 shows diagrammatically an internal combustion engine assembly according to the invention.

FIG. 1 shows diagrammatically an internal combustion engine assembly 1 of the turbocompound type comprising an internal combustion engine 2, a turbocharger 22 consisting of a first exhaust turbine 23 and, driven by this, a compressor 24 compressing the intake air of the engine 2, a second exhaust gas turbine 3, hereinafter called the power turbine, and a transmission 4 between the power turbine 3 and a crankshaft 5 in the internal combustion engine 2. The crankshaft of the engine drives, via a transmission 46 consisting of a coupling 43 and a gearbox 25, a load 6 in the form of, for example, a heavy land vehicle. The exhaust gases from the engine 2 drive in a first stage the exhaust gas turbine 23 and thereafter the series-coupled power turbine 3.

Figure 2:
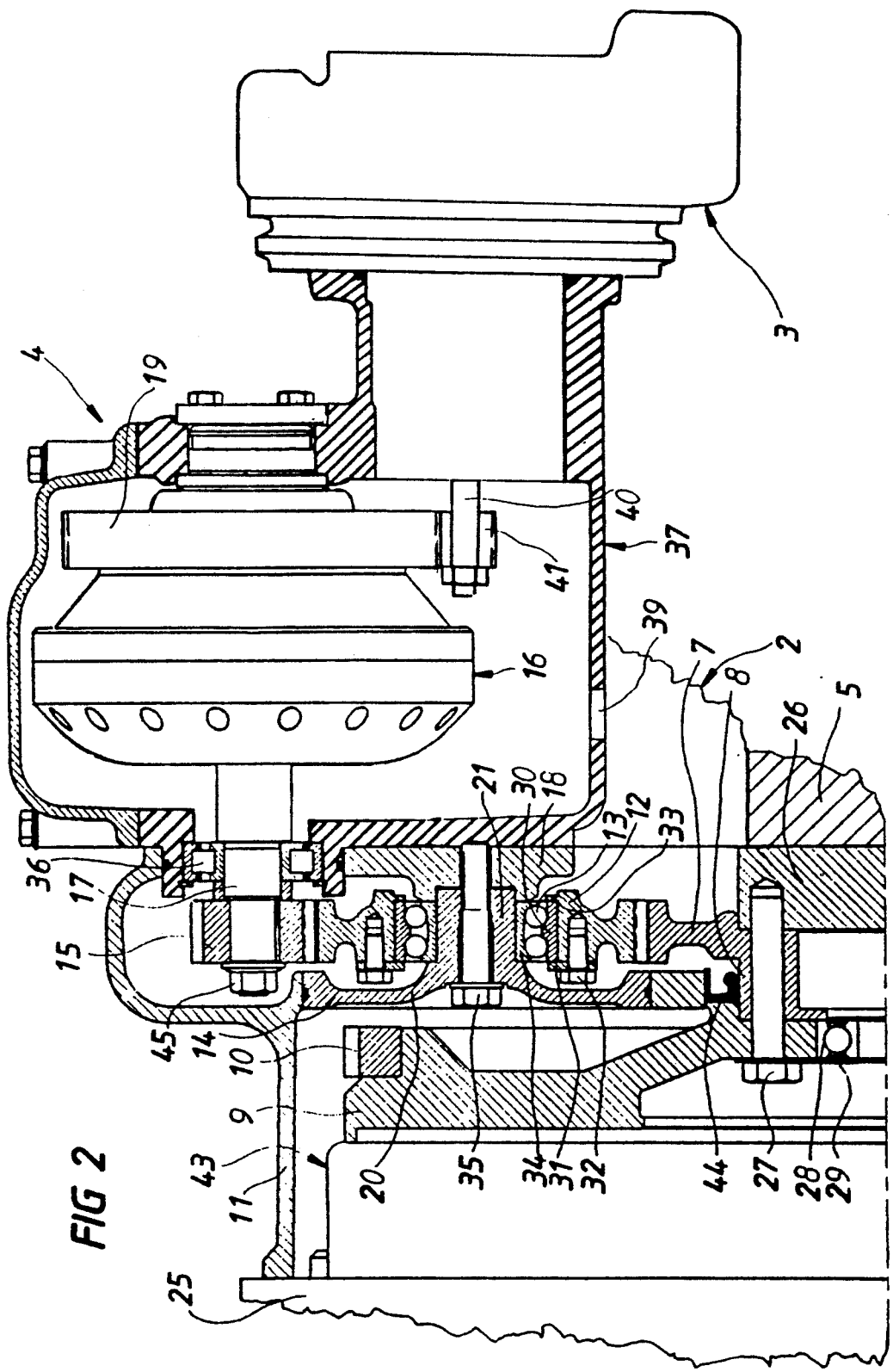
FIG. 2 shows in detail the transmission and flywheel arrangement according to one embodiment of the invention.

FIG. 2 shows a cross-section of the crankshaft 5 of the internal combustion engine. On its circular endplate 26 facing towards a gearbox 25 following downstream in the torque transmission there is arranged a gear wheel 7 on which there is formed a flange 8 with the same diameter D as the endplate 26 of the crankshaft 5. The flange 8 functions as an extension of the crankshaft 5 and as an attachment for a flywheel 9 on whose periphery a ring gear 10 is arranged. As the hub of the gear wheel 7 is designed as an intermediate coupling piece between the endplate 26 of the crankshaft 5 and the flywheel 9 with an identical attachment surface on the flange directed towards the gearbox and on the endplate 26, one and the same flywheel can be used even in engines without comound operation. In the case of compound operation, when the gear wheel 7 is arranged between the endplate of the crankshaft and the flywheel, a compact compound addition is obtained which is mounted close to and partially radially inside of the large flywheel 9, where the whole compound transmission, apart from the hydraulic coupling, lies in a vertical plane just in front of the flywheel. A great advantage of the construction is that long transmission shafts from the power turbine are completely absent. The gear wheel 7 and the flywheel 9 are secured in the endplate 26 of the crankshaft 5 by a bolted joint 27. The flywheel 9 is journalled by a ball bearing 28 which is held in place against the flange 8 of the gear wheel 7 by a bearing holder washer 29 which is pressed against the bearing by the bolted joint 27. The ring gear 10 can be brought into communication in a conventional manner with a starter (not shown).

The flywheel 9 is enclosed by a casing 11 secured to the engine and gearbox and also accommodating parts of the transmission 4 between the crankshaft 5 and the turbine 3. These parts comprise the previously mentioned gear wheel 7 arranged on the crankshaft 5, an intermediate gear wheel 12 with a bearing 13 arranged on a mushroom-shaped bearing holder 14, and a driving gear wheel 15 arranged on a shaft 17 issuing from a hydraulic coupling 16. The intermediate gear wheel 12 is in engagement with and drives the gear wheel 7 and is arranged externally on the outer ring 30 of the bearing 13 and is clamped securely on the latter by means of a washer 31 and a bolted joint 32 which clamps the outer ring 30 against an edge 33 arranged internally on the intermediate gear wheel 12.

The mushroom-shaped bearing holder 14 consists of a cap-like and a foot-like part 20 and 21, respectively, hereinafter called the cap and foot, respectively. Arranged on the foot 21 is the inner ring 34 of the bearing 13. The bearing is held securely by means of the fact that the bolted joint 35 is arranged through the center of the foot 21 and is arranged securely in a part 18 of the casing which faces away from the flywheel 9 and borders a housing 37 accommodating the hydraulic coupling 16. This part 18 thus presses the inner ring 34 of the bearing 13 against the underside of the cap 20. The cap 20 is sealingly clamped in the casing 11, which also seals off with respect to the flange 8 of the gear wheel 7 by means of a seal 44.

The intermediate gear wheel 12 is in engagement with and is driven by the gear wheel 15 which is arranged on the shaft 17 issuing from the hydraulic coupling 16. The gear wheel 15 is fixed on the shaft 17 by means of a bolted joint 45 arranged through its centre and secured at the end of the shaft 17. The shaft 17 is journalled by a roller bearing 36 which separates the coupling housing 37 from that part of the casing 11 in which the gear wheel 15 and the intermediate gear wheel 12 are arranged. The hydraulic coupling 16 is flushed through with oil which, following the coupling, is sprayed out in the coupling housing 37 and is drained through an outlet 39 in the coupling housing 37 to a sump (not shown) in the engine 2. Oil for the transmission between coupling 16 and crankshaft 5 is conveyed from the coupling housing 37 through the bearing 36 and by means of the fact that oil is stirred up from a crank housing (not shown) and splashes onto the gear wheels 7, 12, 15.

The hydraulic coupling 16 is driven by the power turbine 3 via a transmission consisting of a driven gear wheel 19 arranged on the coupling 16, and a driving gear wheel 41 arranged on the turbine shaft 40. The power turbine 3 and the coupling 16 are arranged in separate housings; this in order to facilitate disassembly/assembly upon servicing and repairs. The turbine 3 with the gear wheel 41 can then be removed from the coupling housing 37, and this coupling housing 37 with the gear wheel 15 and the bearing 36 can then be removed from the housing 11 without difficulty. The intermediate gear wheel 12 is also easily accessible without the casing 11 having to be disassembled. When the gearbox 25 and the coupling 43 have been removed, the flywheel 9 and the bearing holder 14 with the bearing 13 are disassembled, and the gear wheel 12 can be detached.

The invention is of great value in an engine production program where different types of internal combustion engine assemblies can be combined together with common base components. The invention therefore contributes considerably to keeping down the costs of a wide engine range, where one and the same base engine can be used with or without compound operation and where the base engine in both cases is optimised from the point of view of functioning and weight.

The number of items which must be kept in the works and spare parts stores is reduced by means of the invention, which contributes to lower costs for the purchasing and maintenance of compound engines.

By having a separate transmission for the power turbine down at the rear end of the crankshaft, all the negative effect which direct coupling on the camshaft timing gears involves is also avoided, and the respective transmissions for camshafts and starter motors can be optimised in respect of their own given preconditions, and the additional torque from the power turbine can also be coupled in at the most favourable point nearest the power outlet of the engine.

The invention permits simple assembly and disassembly of the transmission, which is advantageous both as regards manufacture and assembly of the internal combustion engine assembly and the ongoing maintenance and repair of the latter. Moreover, the solution permits a simple change-over between the manufacture of engine assemblies with or without turbocompound addition.

We claim:

1. An internal combustion engine assembly of the compound type for vehicles, or the like uses, comprising:

an internal combustion engine, the engine having a driven crankshaft, the engine generating exhaust gases;

a turbine to be driven, a transmission between the engine crankshaft and the turbine; means also directing the exhaust gases from the engine to the turbine for driving the turbine;

a gear wheel fixed to the crankshaft for being rotated together with the crankshaft; a flange on the gear wheel and extending in an axial direction therefrom at a location to function as an extension of the crankshaft; the gear wheel further serving as part of the transmission, and the transmission including means extending from the transmission into engagement with the gear wheel for driving the gear wheel;

a rotatable flywheel attached to the flange to rotate with the flange; the gear wheel being located axially between the crankshaft and the flywheel; the connections between the crankshaft, the gear wheel and the flywheel are separable connections enabling disassembly thereof, so that the flywheel can alternatively be directly secured to the crankshaft without the gear wheel.

2. The internal combustion engine assembly of claim 1, further comprising an end plate secured to the crankshaft and the gear wheel being secured on the crankshaft by being secured to the end plate, such that the flywheel can be secured to the crankshaft through the gear wheel and the flywheel is alternatively adapted to be directly secured against the end plate on the crankshaft without the gear wheel.

3. The internal combustion engine assembly of claim 2, wherein the flange on the gear wheel has an outer diameter that is the same as the outer diameter of the end plate on the crank shaft.

4. The internal combustion engine assembly of claim 2, further comprising an intermediate gear attached to the transmission and connected to the turbine through the transmission for transmitting power from the turbine to the intermediate gear; the intermediate gear being in engagement with the gear wheel and the gear wheel engaging the crankshaft so that power from the turbine is transmitted through the transmission, to the intermediate gear wheel, to the gear wheel and to the crank shaft.

5. The internal combustion engine assembly of claim 4, further comprising a bearing for the intermediate gear about which the intermediate gear rotates; a bearing holder for supporting the bearing for the intermediate gear; and a casing secured to the engine assembly and enclosing the flywheel, and the casing also serving as means for attaching and supporting the bearing holder.

6. The internal combustion engine assembly of claim 5, wherein the casing and the flange of the gear wheel are spaced apart in a manner which might enable oil from the transmission to pass by the flange and move to the flywheel; a seal between the casing and the flange of the gear wheel for sealing off oil from the transmission from passing the seal toward the flywheel.

7. The internal combustion engine assembly of claim 6, wherein it is the bearing holder attached to the casing that is spaced from the flange, and the seal is between the bearing holder and the flange.

8. The internal combustion engine assembly of claim 5, wherein the bearing holder has a center around which the bearing is disposed and the bearing holder has a demountable attachment member at the center for enabling detachable mounting of the bearing holder at the casing.

* * * * *